US012736614B2

(12) United States Patent
Aoyama et al.

(10) Patent No.: US 12,736,614 B2
(45) Date of Patent: Sep. 15, 2026

(54) VEHICLE EXTERIOR COMPONENT

(71) Applicant: TOYODA GOSEI CO., LTD., Kiyosu (JP)

(72) Inventors: Shunsuke Aoyama, Kiyosu (JP); Keigo Kondo, Kiyosu (JP); Koji Okumura, Kiyosu (JP)

(73) Assignee: TOYODA GOSEI CO., LTD., Aichi-Pref. (JP)

( * ) Notice: Subject to any disclaimer, the term of this patent is extended or adjusted under 35 U.S.C. 154(b) by 275 days.

(21) Appl. No.: 18/598,014

(22) Filed: Mar. 7, 2024

(65) Prior Publication Data

US 2024/0319328 A1 Sep. 26, 2024

(30) Foreign Application Priority Data

Mar. 24, 2023 (JP) ................................ 2023-048511

(51) Int. Cl.

*G01S 7/02* (2006.01)
*F21S 43/14* (2018.01)
*F21S 43/20* (2018.01)
*H01Q 1/42* (2006.01)

(52) U.S. Cl.

CPC .............. *G01S 7/027* (2021.05); *F21S 43/14* (2018.01); *F21S 43/26* (2018.01); *H01Q 1/42* (2013.01)

(58) Field of Classification Search

CPC .......... G01S 7/027; G01S 2013/93271; G01S 13/931; F21S 43/14; F21S 43/26; H01Q 1/42; B60Q 1/2661; B60R 13/005; G09F 13/04; G09F 13/0409; G09F 13/044

See application file for complete search history.

(56) References Cited

U.S. PATENT DOCUMENTS

2017/0357044 A1* 12/2017 Kuramitsu ............ G02B 6/005
2019/0356046 A1* 11/2019 Mayer Pujadas .... B60Q 1/0011
2020/0200356 A1* 6/2020 Potter .................... F21S 41/19
2020/0386381 A1* 12/2020 Aizawa .................. F21S 43/50

(Continued)

FOREIGN PATENT DOCUMENTS

CN 114872639 A 8/2022
JP 2011-093378 A 5/2011

(Continued)

OTHER PUBLICATIONS

Office Action dated Dec. 16, 2025 issued in corresponding Japanese patent application No. 2023-048511 (and English translation).

*Primary Examiner* — Christopher E Dunay
(74) *Attorney, Agent, or Firm* — Posz Law Group, PLC

(57) ABSTRACT

A vehicle exterior component includes a cover, a housing, a flat substrate, a light emitter, and a lens. The cover and the housing are located frontward from a radar device in an electromagnetic wave transmission direction of the radar device. The radar device is installed in a vehicle. The flat substrate is arranged inside the housing. The light emitter is arranged on the substrate. The lens is arranged inside the housing. The housing extends over a surface of the cover facing the radar device. The light emitter emits light that illuminates an ornamental portion of the cover. The substrate is located outside an electromagnetic wave transmission range of the radar device. The lens reflects the light from the light emitter toward the ornamental portion.

6 Claims, 7 Drawing Sheets

(56) References Cited

U.S. PATENT DOCUMENTS

| | | | | |
|---|---|---|---|---|
| 2023/0051331 | A1* | 2/2023 | Grard | F21S 41/24 |
| 2023/0266435 | A1* | 8/2023 | Nakayama | B60Q 1/0041<br>342/52 |
| 2023/0314558 | A1 | 10/2023 | Aoyama et al. | |
| 2025/0167437 | A1* | 5/2025 | Bajec Strle | G01S 7/027 |

FOREIGN PATENT DOCUMENTS

| | | | |
|---|---|---|---|
| JP | 2019-217863 | A | 12/2019 |
| JP | 2023-148204 | A | 10/2023 |

* cited by examiner

VEHICLE EXTERIOR COMPONENT

BACKGROUND

Field

The present disclosure relates to a vehicle exterior component.

Description of Related Art

Vehicles such as automobiles may include a radar device that transmits and receives electromagnetic waves of millimeter waves used to detect an object outside the vehicle. The radar device transmits the electromagnetic waves out of the vehicle. When the electromagnetic waves strike an object, the electromagnetic waves are reflected. The reflected waves are received by the radar device. In such a manner, the transmission and reception of the electromagnetic radio waves allow the radar device to detect an object outside the vehicle. To conceal the radar device, a vehicle exterior component such as an emblem may be attached to the vehicle in front of the radar device in the direction in which the electromagnetic waves are transmitted.

The vehicle exterior component includes a cover and a housing, which are located frontward from the radar device in the transmission direction of the electromagnetic waves. The cover and the housing are formed from a material that allows for the transmission of the electromagnetic waves. The housing extends over the surface of the cover that faces the radar device. The cover includes an ornamental portion that enhances the aesthetic appeal of the vehicle exterior component. A luminous emblem, which is known as such a vehicle exterior component, illuminates and brightens the ornamental portion of the cover to enhance the aesthetic appeal of the ornamental portion.

Japanese Laid-Open Patent Publication No. 2011-93378 discloses a first embodiment of a vehicle exterior component (luminous emblem) including a cover and a flat light guide located at the rear side of the cover, that is, the side of the cover facing a radar device. A substrate is arranged at the edge of the light guide. A light emitter is arranged on the substrate to emit light toward the light guide. In this case, the light from the light emitter enters the light guide and diffuses inside the light guide to brightly illuminate the entire light guide. As a result, the ornamental portion of the cover, which receives light from the light guide, is illuminated and brightened uniformly.

A second embodiment of the vehicle exterior component (luminous emblem) disclosed in the above publication includes a cover and a substrate located at the rear side of the cover. A light emitter is arranged on the substrate outside a range in which electromagnetic waves are transmitted from a radar device. The light emitter emits light directly toward an ornamental portion of the cover. The substrate including the light emitter is arranged outside the electronic wave transmission range because the substrate obstructs the transmission of electromagnetic waves from the radar device. In this case, a light guide such as that of the first embodiment can be omitted. This simplifies the structure of the vehicle exterior component.

When the light guide is located at the rear side of the vehicle exterior component as described in the first embodiment of the above publication, the electromagnetic waves transmitted from the radar device pass through the light guide. Even if the light guide is formed from a material allowing for the passage of electromagnetic waves, the electromagnetic waves transmitted from the radar device will attenuate when passing through the light guide and lower the transmittivity of electromagnetic waves in the vehicle exterior component.

If the light guide is omitted like in the second embodiment of the above publication, the transmittivity of electromagnetic waves in the vehicle exterior component will not decrease. In this case, however, the light emitter will have to be arranged outside the transmission range of the electromagnetic waves from the radar device. Further, the light emitter will have to be oriented so that the light from the light emitter is directed toward the ornamental portion of the cover. When the light emitter emits light toward the ornamental portion of the cover, the light emitted from the light emitter will be emitted in a biased direction. Thus, the ornamental portion of the cover may not be illuminated and brightened uniformly. When orienting the light emitter so that the light emitter emits light toward the ornamental portion, if the substrate including the light emitter is formed from a flexible material, the substrate can be bent to direct the light from the light emitter toward the ornamental portion. The flexible substrate is, however, costly. This will increase the manufacturing cost of the vehicle exterior component.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle exterior component includes a cover, a housing, a flat substrate, a light emitter, and a lens. The cover and the housing are located frontward from a radar device in an electromagnetic wave transmission direction of the radar device. The radar device is installed in a vehicle. The flat substrate is arranged inside the housing. The light emitter is arranged on the substrate. The lens is arranged inside the housing. The housing extends over a surface of the cover facing the radar device. The light emitter emits light that illuminates an ornamental portion of the cover. The substrate is located outside an electromagnetic wave transmission range of the radar device. The lens reflects the light from the light emitter toward the ornamental portion.

Other features and aspects will be apparent from the following detailed description, the drawings, and the claims.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

One embodiment of a vehicle exterior component will now be described with reference to FIGS. 1 to 10.

Figure 1:
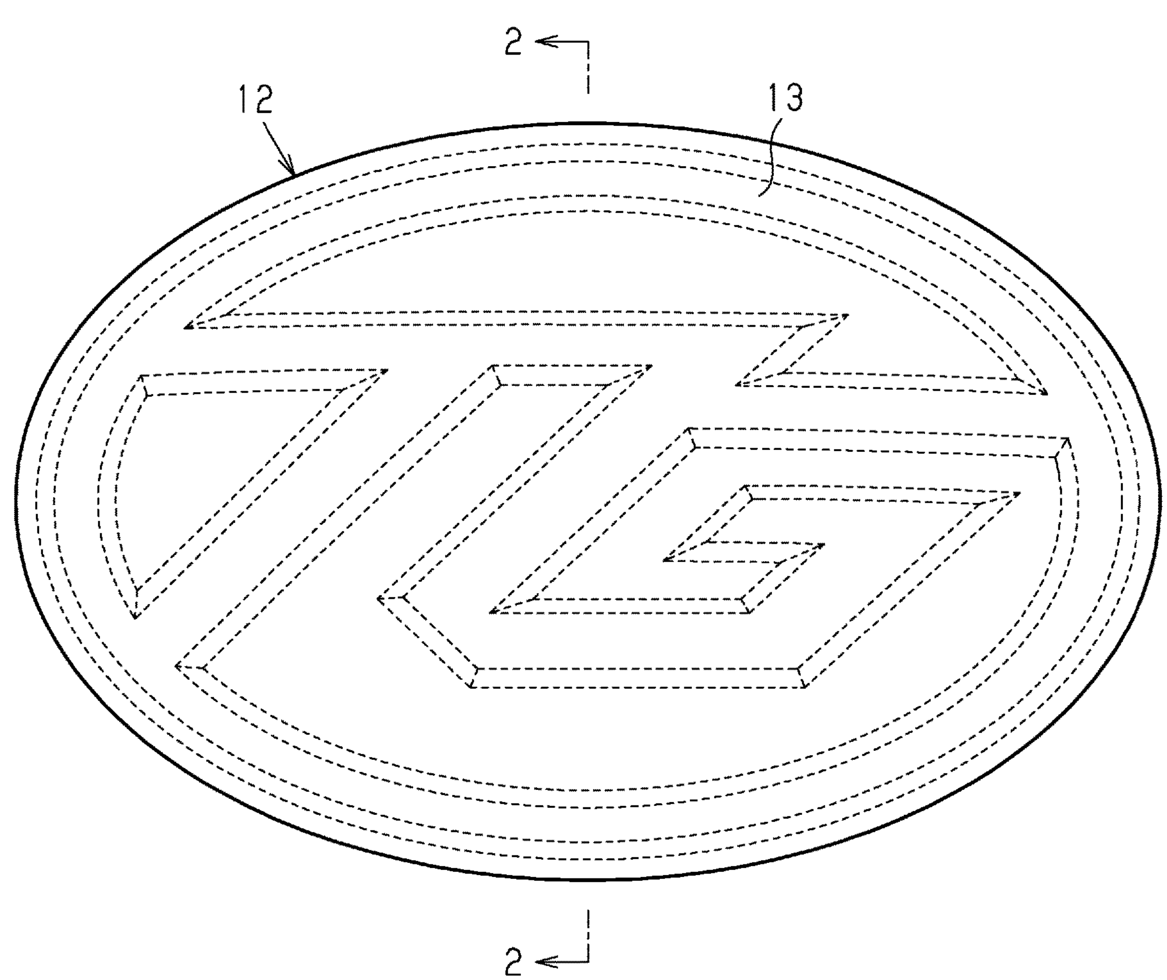
FIG. 1 is a front view showing a luminous emblem serving as a vehicle exterior component.
Figure 2:
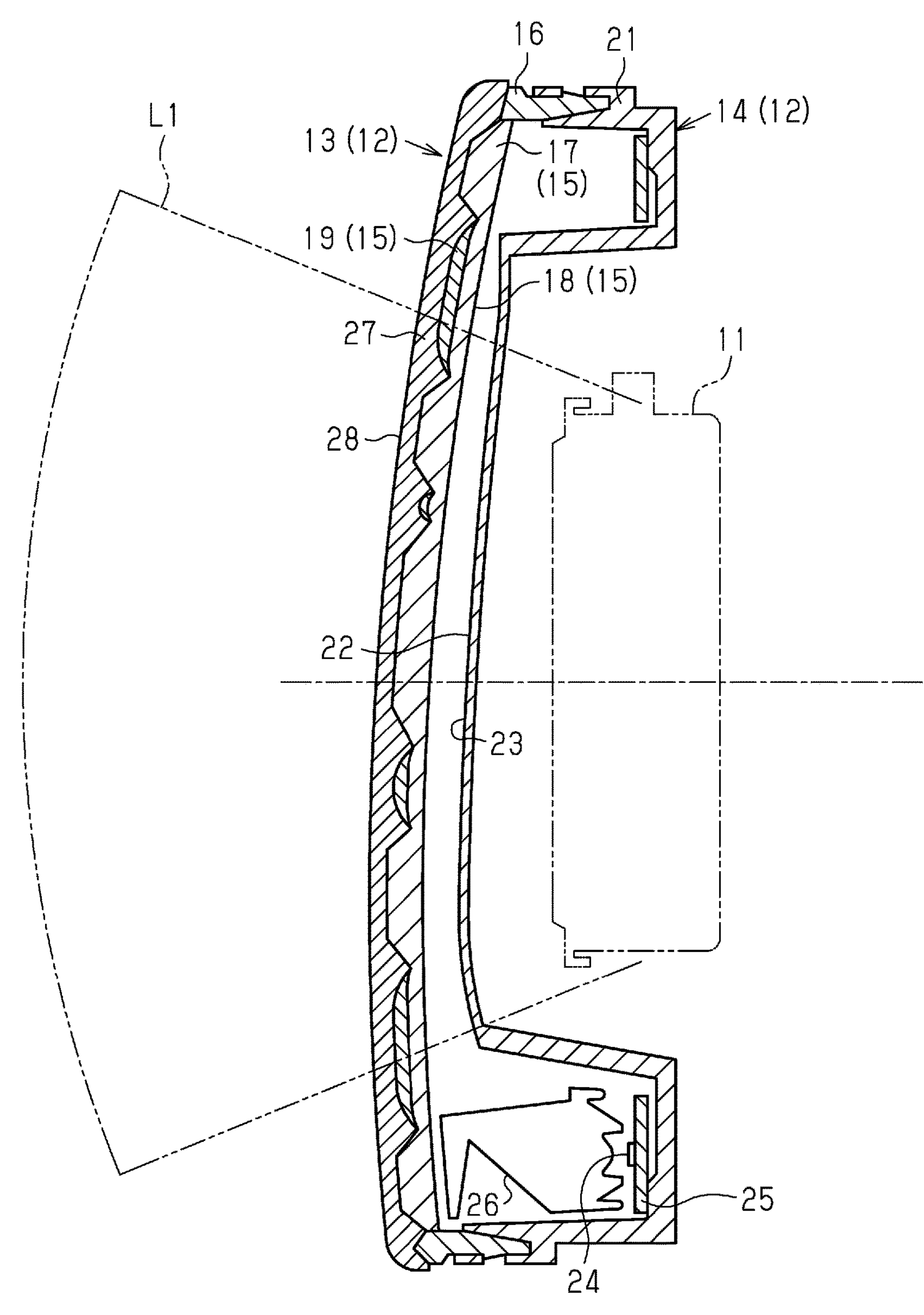
FIG. 2 is a cross-sectional view of the luminous emblem and a radar device taken along line 2-2 in FIG. 1.

FIG. 1 shows a luminous emblem 12, which serves as the vehicle exterior component, and FIG. 2 shows the cross section of the luminous emblem 12 taken along line 2-2 in FIG. 1. The luminous emblem 12 may be fitted into an opening formed in an exterior panel of a vehicle, such as an automobile. Such an exterior panel may be a panel such as a bumper that does not include air passages, a panel such as a grille that includes air passages, a panel such as a garnish that enhances the aesthetic appeal, or the like.

As shown in FIG. 2, a radar device 11 is installed in the vehicle. The radar device 11 transmits millimeter waves, which are electromagnetic waves, out of the vehicle, and receives the millimeter waves reflected when striking an object outside the vehicle, namely, reflected waves. The radar device 11 detects an object outside the vehicle through such transmission and reception of millimeter waves. In FIG. 2, double-dashed line L1 shows the range in which millimeter waves are transmitted from the radar device 11. The luminous emblem 12 is arranged on the vehicle frontward from the radar device 11 in the transmission direction of the millimeter waves, that is, toward the left in FIG. 2. As a result, the luminous emblem 12 conceals the radar device 11 so that the radar device 11 is not visible from outside the vehicle.

Luminous Emblem 12

The luminous emblem 12 includes a cover 13 and a housing 14 that are located frontward from the radar device 11 in the millimeter wave transmission direction. The cover 13 and the housing 14 are formed from a material that allows for the transmission of electromagnetic waves such as millimeter waves. The housing 14 extends over the side of the cover 13 facing the radar device 11, that is, the right surface of the cover 13 as viewed in FIG. 2.

The cover 13 includes an ornamental portion 15 and a frame 16. The ornamental portion 15 enhances the aesthetic appeal of the luminous emblem 12 and includes a base 17, a light diffusing layer 18, and a decorative layer 19. The base 17 is formed by a plastic plate. The base 17 allows for the transmission of millimeter waves and the transmission of visible light. The edge of the base 17 is thermally welded to the frame 16, which is formed from plastic. The frame 16 is used for attachment of the housing 14. Further, the frame 16 is ring-shaped and extends along the edge of the base 17.

Figure 3:
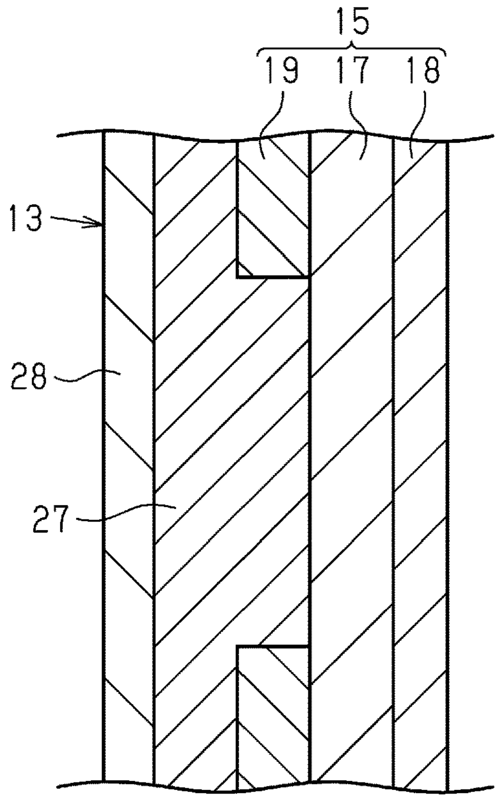
FIG. 3 is an enlarged cross-sectional view of an ornamental portion in a cover of the luminous emblem illustrated in FIG. 1.

FIG. 3 is a cross-sectional view of the ornamental portion 15 in the cover 13. The light diffusing layer 18 is formed on the rear surface, or right surface as viewed in FIG. 3, of the base 17 in the ornamental portion 15. The light diffusing layer 18 allows for the transmission of millimeter waves. Further, the light diffusing layer 18 transmits and diffuses incident light. The decorative layer 19 is formed on the front surface, or left surface as viewed in FIG. 3, of the base 17 and allows for the transmission of millimeter waves. The front surface of the base 17 and the decorative layer 19 are covered by a transparent layer 27 formed from a transparent plastic or the like. A hard coating layer 28 for protection purposes or the like is formed on the front surface of the transparent layer 27. The transparent layer 27 and the hard coating layer 28 allow for the transmission of millimeter waves and the transmission of visible light. Thus, the ornamental portion 15 of the cover 13 is visible from the outside of the vehicle through the transparent layer 27 and the hard coating layer 28.

The housing 14 shown in FIG. 2 is formed from a material such as plastic that allows for the transmission of millimeter waves. The housing 14 includes a flange 21 and a projection 22. The flange 21 is projected toward the frame 16 of the cover 13 at a location corresponding to the edge of the cover 13, or the frame 16. In the same manner as the frame 16 of the cover 13, the flange 21 is ring-shaped and extends along the edge of the cover 13. The flange 21 is attached to the frame 16 so that the housing 14 extends over the surface of the cover 13 facing the radar device 11. The projection 22 of the housing 14 is located closer to the central part of the cover 13 than the flange 21. The projection 22 is formed by bending and projecting the housing 14 toward the cover 13 at the above location. The formation of the projection 22 in the housing 14 shortens the distance between the cover 13 and the housing 14 in the luminous emblem 12. This allows the luminous emblem 12 to have a compact size.

Figure 4:
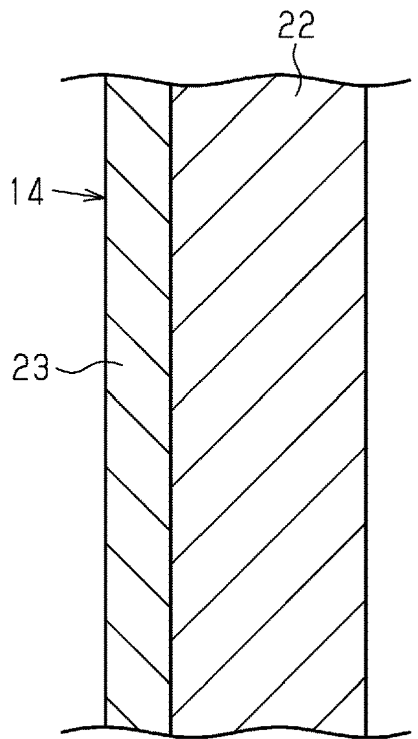
FIG. 4 is an enlarged cross-sectional view showing the part where a projection of a housing of the luminous emblem illustrated in FIG. 1 faces the cover.

FIG. 4 is an enlarged cross-sectional view showing the projection 22 of the housing 14 at a location where the projection 22 faces the cover 13. As shown in FIG. 4, a white layer 23 is formed on the portion of the projection 22 facing the cover 13. The white layer 23 reflects and diffuses incident light. Preferably, the light striking the white layer 23 is totally reflected by the white layer 23. Incident light causes the white layer 23 to appear to be white. The white layer 23, however, does not have to appear to be white as long as it functions as a diffusing layer that diffuses incident light. The projection 22 and the white layer 23 allow for the passage of millimeter waves.

The luminous emblem 12 shown in FIG. 2 emits light to the ornamental portion 15 of the cover 13 in order to illuminate the ornamental portion 15. A flat substrate 25 is located between the flange 21 and the projection 22 in the housing 14. Light emitters 24 are arranged on the substrate 25. The light emitters 24 that emit light to the ornamental portion 15 of the cover 13 may be, for example, LEDs. The light emitted from the light emitters 24 to the ornamental portion 15 of the cover 13 illuminates the ornamental portion 15. The substrate 25 including the light emitters 24 obstructs the passage of millimeter waves. Thus, the substrate 25 that is ring-shaped extends outside the millimeter wave transmission range of the radar device 11 so as to surround the transmission range. The light emitters 24 are arranged at predetermined intervals on the ring-shaped substrate 25.

The ring-shaped flat substrate 25 is arranged between the flange 21 and the projection 22 inside the cover 13. Thus, the direction in which the substrate 25 is oriented, that is, the direction in which light is emitted from the light emitters 24, is substantially the same as the millimeter wave transmission direction of the radar device 11. As a result, it would be difficult for the light emitted from the light emitters 24 on the substrate 25 from between the flange 21 and the projection 22 to reach the ornamental portion 15 of the cover 13. Thus, a lens 26 is arranged frontward from the light emitters 24 in the millimeter wave transmission direction of the radar device 11 between the flange 21 and the projection 22 inside the housing 14. The lens 26 reflects the light from the light emitters 24 toward the ornamental portion 15.

Dimensions and Angles of Each Part of Luminous Emblem 12

Figure 5:
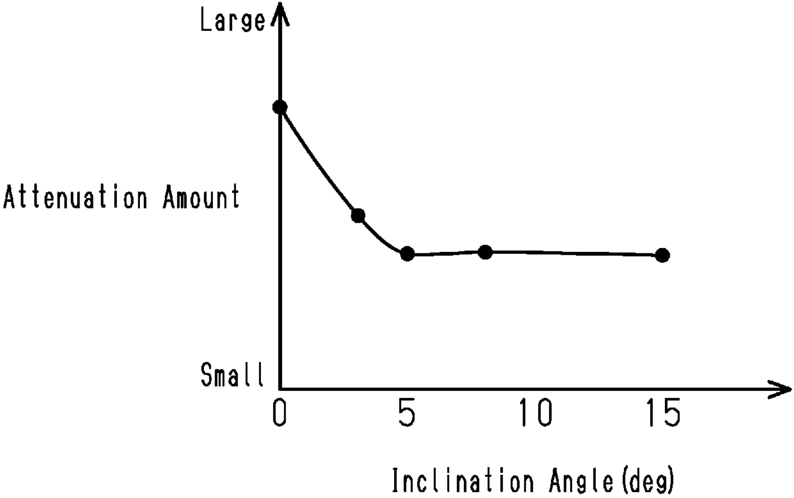
FIG. 5 is a graph showing the relationship of the attenuation amount of millimeter waves, which are transmitted from and received by the radar device, when passing through the projection of the housing with respect to the inclination angle of the part of the projection facing the cover.

FIG. 5 is a graph showing the attenuation amount of the millimeter waves, which are transmitted from and received by the radar device 11, when passing through the projection 22 of the housing 14. The horizontal axis of the graph represents the angle of the portion of the projection 22 facing the cover 13, more specifically, the inclination angle with respect to a plane perpendicular to the single-dashed line in FIG. 2, which extends in the millimeter wave transmission direction of the radar device 11. As shown by the solid line in FIG. 5, the millimeter wave attenuation amount indicated by the vertical axis decreases as the inclination angle increases. The inclination angle in the luminous emblem 12 may be 1° or greater; preferably, 3° or greater. The upper limit value of the inclination angle is determined by design factors such as the size of the luminous emblem 12. The inclination angle is smaller than the upper limit value.

Figure 6:
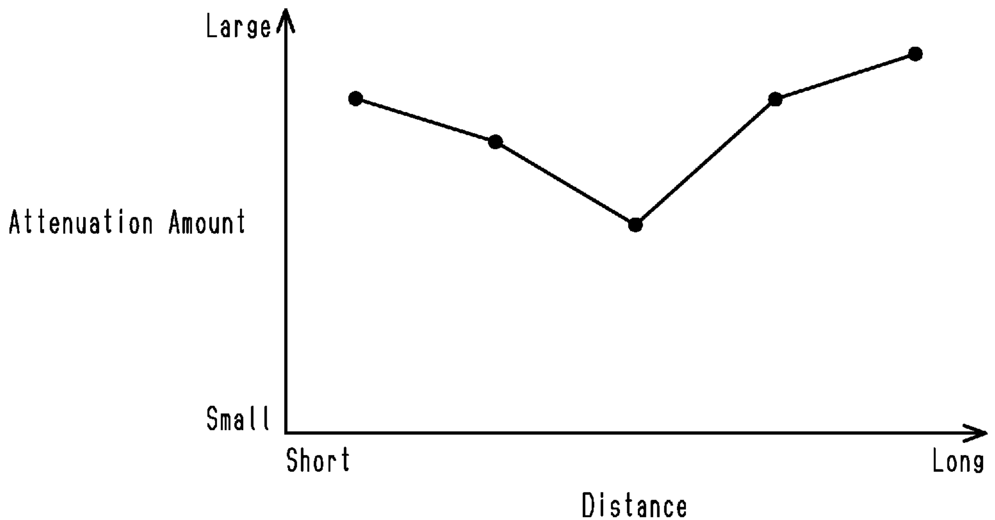
FIG. 6 is a graph showing the relationship of an attenuation amount of millimeter waves, which are transmitted from and received by the radar device, when passing through the housing projection and the cover with respect to the distance between a central part of the cover and a central part of the housing projection.

FIG. 6 is a graph showing the attenuation amount of the millimeter waves, which are transmitted from and received by the radar device 11, when passing through the projection 22 of the housing 14 and the cover 13. The horizontal axis of the graph represents the distance between the central part of the cover 13 and the central part of the projection 22 of the housing 14. As shown by the solid line in FIG. 6, the millimeter wave attenuation amount indicated by the vertical axis changes as the distance changes. As apparent from FIG. 6, the millimeter wave attenuation amount becomes the minimum at a certain distance, increases as the distance becomes shorter than the certain distance, and increases as the distance becomes longer than the certain distance. The certain distance at which the millimeter wave attenuation amount becomes the minimum is an integer multiple of the half wavelength of the millimeter waves. Further, the certain distance at which the millimeter wave attenuation amount becomes the minimum in the luminous emblem 12 is included in a predetermined range.

Figure 7:
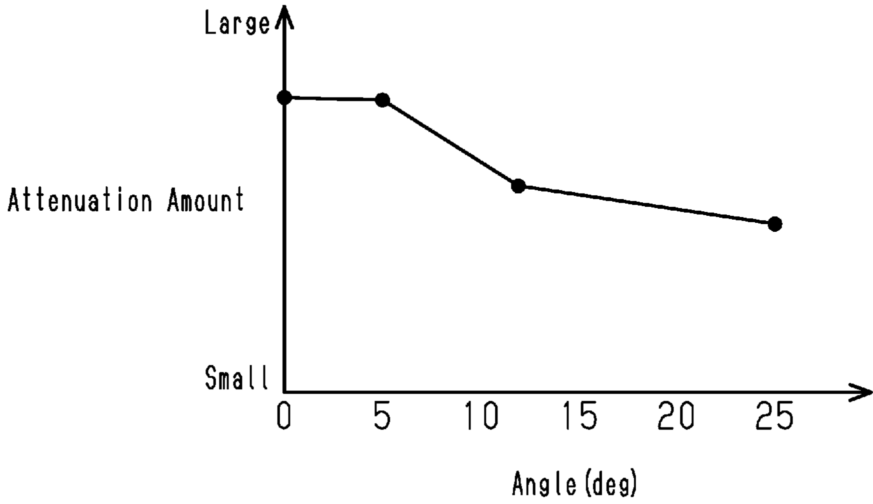
FIG. 7 is a graph showing the relationship of an attenuation amount of millimeter waves, which are transmitted from and received by the radar device, after passing through the housing projection and the cover with respect to the angle of a flange in the housing.

FIG. 7 is a graph showing the attenuation amount of the millimeter waves, which are transmitted from and received by the radar device 11, after passing through the projection 22 of the housing 14 and the cover 13. Such attenuation of the millimeter waves transmitted from the radar device 11 occurs when the millimeter waves strike the flange 21 and are partly reflected. More specifically, the millimeter waves striking the flange 21 approach the millimeter waves reflected by the flange 21. Thus, the millimeter waves interfere with one another in front of the radar device 11 of the luminous emblem 12 in the millimeter wave transmission direction. Such interference of the millimeter waves results in the attenuation of the millimeter waves after passing through the projection 22 of the housing 14 and the cover 13.

The horizontal axis of the graph in FIG. 7 represents the angle of the flange 21 in the housing 14, more specifically, the inclination angle with respect to the single-dashed line of FIG. 2. The vertical axis of the graph in FIG. 7 represents the millimeter wave attenuation amount that decreases as the angle of the flange 21 increases as shown by the solid line. A smaller angle of the flange 21 will result in more millimeter waves being reflected by the flange 21 toward one another and increase the tendency of interference occurring between the millimeter waves. In contrast, a larger angle of the flange 21 will result in less millimeter waves being reflected by the flange 21 toward one another and limit interference between the millimeter waves.

The angle of the flange 21 in the luminous emblem 12 is, 1° or greater; preferably, 3°. The upper limit value of the angle of the flange 21 is determined by design factors such as the size of the luminous emblem 12. The angle of the flange 21 is smaller than the upper limit value. In FIG. 7, the millimeter wave attenuation amount does not change when the angle of the flange 21 is 0° to 5° because the attenuation amount is affected by the inclination angle, which is shown in FIG. 5, and the distance, which is shown in FIG. 6, of the luminous emblem 12, in addition to the distance shown in FIG. 8, which will be described below. If these effects are eliminated when the angle of the flange 21 is 0° to 5°, the attenuation amount will gradually decrease as the angle increases.

Figure 8:
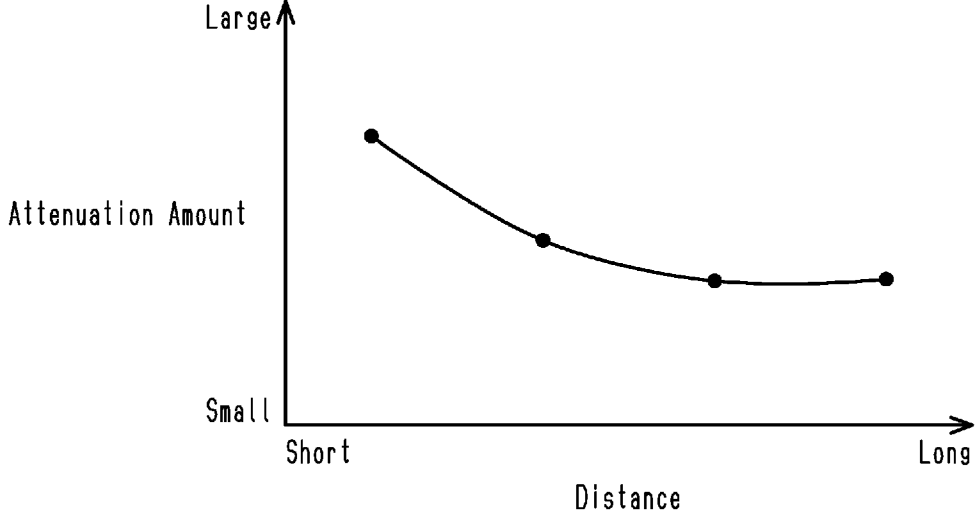
FIG. 8 is a graph showing the relationship of an attenuation amount of millimeter waves, which are transmitted from and received by the radar device, when passing through the housing projection and the cover with respect to the distance between a substrate and a millimeter wave transmission range of the radar device.

FIG. 8 is a graph that also shows the attenuation amount of the millimeter waves, which are transmitted from and received by the radar device 11, when passing through the projection 22 of the housing 14 and the cover 13. The horizontal axis of the graph represents the distance from the millimeter wave transmission range of the radar device 11, that is, the range indicated by the double-dashed line L1 shown in FIG. 2, to the substrate 25 surrounding the range. The vertical axis of the graph in FIG. 8 represents the millimeter wave attenuation amount that decreases as the distance increases as shown by the solid line. The distance from the millimeter wave transmission range of the radar device 11 to the substrate 25 in the luminous emblem 12 is set to be greater than the distance at which the millimeter wave attenuation amount shown by the solid line in FIG. 8 is of a predetermined tolerance level.

Lens 26

Figure 9:
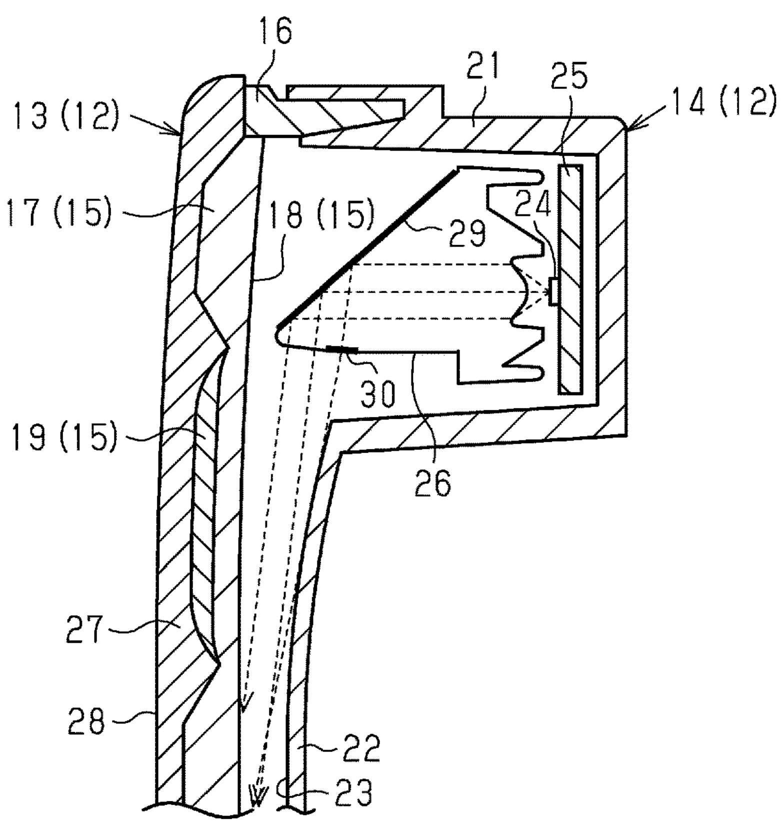
FIG. 9 is an enlarged cross-sectional view of a lens in the luminous emblem illustrated in FIG. 2.

As shown in FIG. 9, the lens 26 is located frontward from the light emitters 24 in the millimeter wave transmission direction of the radar device 11, that is, toward the left in FIG. 9. The light from the light emitters 24 is emitted frontward in the millimeter wave transmission direction of the radar device 11, that is, toward the cover 13. The lens 26 includes a reflection surface 29 and a refraction surface 30. The reflection surface 29 reflects the light from the light emitters 24 toward the ornamental portion 15 of the cover 13. The refraction surface 30 passes and refracts the light reflected by the reflection surface 29 so that the light avoids the corner of the projection 22 that is located toward the flange 21. The arrowed broken lines in FIG. 9 indicate the travel path of the light from the light emitters 24.

Figure 10:
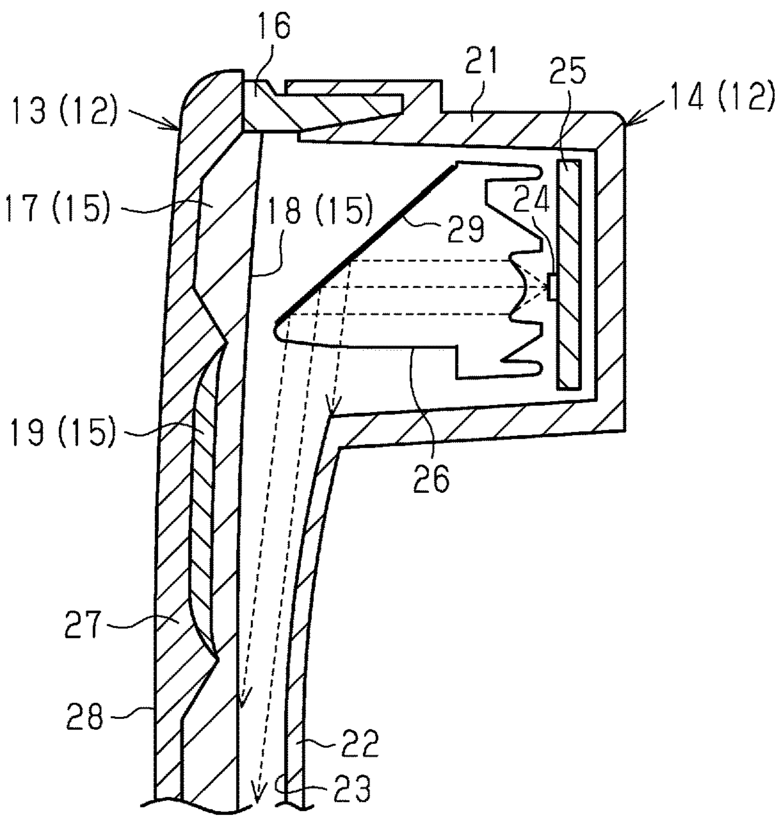
FIG. 10 is a cross-sectional view of a lens in a luminous emblem of a comparative example.

In FIG. 10, the arrowed broken lines indicate the travel path of the light from the light emitters 24 when the lens 26 does not include the refraction surface 30. If the housing 14 includes the projection 22 to reduce the size of the luminous emblem 12, the light from the light emitters 24 reflected by the reflection surface 29 of the lens 26 would be blocked by the corner of the projection 22 located toward the flange 21. This would decrease the light that reaches the ornamental portion 15 of the cover 13. In this respect, when the lens 26 includes the refraction surface 30 shown in FIG. 9, the light reflected by the reflection surface 29 will be refracted when passing through the refraction surface 30. Thus, the light will avoid the corner of the projection 22.

The advantages of the luminous emblem 12 will now be described.

(1) In the housing 14, the ring-shaped substrate 25, on which the light emitters 24 are arranged, extends outside the millimeter wave transmission range of the radar device 11 so as to surround the transmission range. Although the light emitters 24 are not oriented toward the ornamental portion 15 of the cover 13, the light emitted from the light emitters 24 is reflected by the reflection surface 29 of the lens 26 toward the ornamental portion 15 of the cover 13. This illuminates the ornamental portion 15 of the cover 13. Thus, a costly flexible substrate 25 does not have to be used to orient the light emitters 24 toward the ornamental portion 15 so that the light emitters 24 emit light toward the ornamental portion 15. This allows the manufacturing cost of the luminous emblem 12 to be lowered. Accordingly, the ornamental portion 15 of the cover 13 in the luminous emblem 12 can be illuminated at a low cost.

(2) Light can be emitted from the light emitters 24 to the ornamental portion 15 of the cover 13 to illuminate the ornamental portion 15 even though a light guide is not arranged between the ornamental portion 15 of the cover 13 and the radar device 11 as shown in the related art. Since there is no light guide that the millimeter waves emitted from the radar device 11 have to pass through, there is no light guide that decreases the millimeter wave transmittivity of the luminous emblem 12. Further, the luminous emblem 12 that does not include a light guide can be reduced in size.

(3) The substrate 25, which includes the light emitters 24, is located between the flange 21 and the projection 22 in the housing 14. The light from the light emitters 24 is reflected by the reflection surface 29 of the lens 26, which is located between the flange 21 and the projection 22, toward the ornamental portion 15 of the cover 13 in the housing 14. Further, the reflected light is refracted when passing through the refraction surface 30 of the lens 26 so as to avoid the corner of the projection 22 in the housing 14. This limits decreases in the amount of the light from the light emitters 24 that reaches the ornamental portion 15 of the cover 13.

(4) When the light from the light emitters 24 is emitted toward the ornamental portion 15 of the cover 13, the light strikes the light diffusing layer 18 on the ornamental portion 15. The light diffusing layer 18 passes and diffuses the striking light so as to brighten the ornamental portion 15. This further enhances the aesthetic appeal of the ornamental portion 15.

(5) The light from the light emitters 24 striking the light diffusing layer 18 of the ornamental portion 15 in the cover 13 is partly reflected by the light diffusing layer 18 toward the projection 22 of the housing 14 and to the white layer 23 on the projection 22 of the housing 14. The light striking the white layer 23 is partly reflected by the white layer 23 toward the light diffusing layer 18 on the ornamental portion 15 of the cover 13. The light reflected repeatedly between the light diffusing layer 18 and the white layer 23 uniformly illuminates the ornamental portion 15 of the cover 13.

The above embodiment may be modified, for example, as described below. The above embodiment and the modified examples described below may be combined as long as there is technical consistency.

Figure 11:
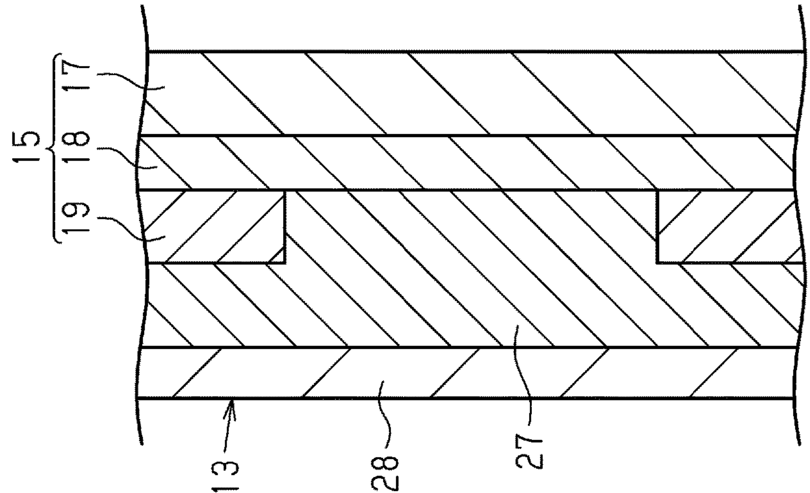
FIG. 11 is a cross-sectional view showing a light diffusing layer of the ornamental portion in a further example of the cover of the luminous emblem.

As shown in FIG. 11, the light diffusing layer 18 may be formed on the front surface of the base 17, that is, the left surface of the base 17 as viewed in FIG. 11. In this case, the decorative layer 19 is formed on the front surface of the light diffusing layer 18, and the front surface of the light diffusing layer 18 and the decorative layer 19 are covered by the transparent layer 27.

The light striking the white layer 23 does not necessarily have to be totally reflected by the white layer 23.

One or both of the light diffusing layer 18 and the white layer 23 may be omitted.

The refraction surface 30 of the lens 26 may be omitted depending on the shape or the like of the projection 22 in the housing 14.

The radar device 11 may transmit and receive electromagnetic waves other than millimeter waves, such as infrared light or laser light.

Figure 12:
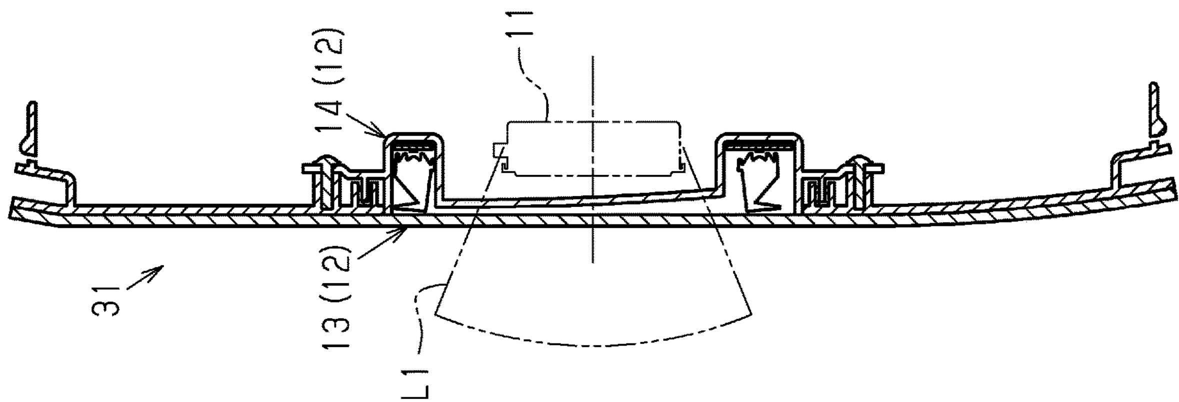
FIG. 12 is a cross-sectional view showing another example of the vehicle exterior component.

The vehicle exterior component is exemplified by the luminous emblem 12, which is fitted into an opening formed in an exterior panel. Instead, as shown in FIG. 12, the cover 13 of the luminous emblem 12 may be, for example, integrated with an exterior panel 31, and the exterior panel 31 may be the vehicle exterior component. In this case, the exterior panel 31, or the vehicle external component, may be a panel such as a bumper that does not include air passages, a panel such as a grille that includes air passages, a panel such as a garnish that enhances the aesthetic appeal, or the like.

The location where the vehicle external component is attached to the vehicle may be any one of the front, the side, and the rear of the vehicle.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle exterior component, comprising:

a cover and a housing that are located frontward from a radar device in an electromagnetic wave transmission direction of the radar device, the radar device being installed in a vehicle;

a flat substrate arranged inside the housing;

a light emitter arranged on the substrate; and a lens arranged inside the housing, wherein the housing extends over a surface of the cover facing the radar device, the light emitter emits light that illuminates an ornamental portion of the cover, the substrate is located outside an electromagnetic wave transmission range of the radar device, the lens reflects the light from the light emitter toward the ornamental portion, the ornamental portion of the cover includes a light diffusing layer, the light diffusing layer is configured to transmit and diffuse incident light, and to reflect a portion of the incident light toward an inner side of the housing, the housing includes a projection, the projection including a white layer, and the light diffusing layer and the white layer are disposed facing each other such that light reflected by the light diffusing layer strikes the white layer and is reflected therefrom toward the light diffusing layer, to thereby uniformly illuminate the ornamental portion by light repeatedly reflected between the light diffusing layer and the white layer.

2. The vehicle exterior component according to claim 1, wherein:

the housing includes a flange and the projection, the flange being projected toward the cover at a location corresponding to an edge of the cover, and the projection being bent and projected toward the cover at a location closer to a central part of the cover than the flange;

the substrate and the lens are located between the projection and the flange; and the lens includes a reflection surface and a refraction surface, the reflection surface reflecting the light from the light emitter toward the ornamental portion of the cover, and the refraction surface passing the light reflected by the reflection surface so that the light avoids a corner of the projection located toward the flange.

3. The vehicle exterior component according to claim 2, wherein the reflection surface is inclined with respect to the electromagnetic wave transmission direction, and at least a portion of the reflection surface is located on a rear side relative to the white layer in the electromagnetic wave transmission direction.

4. The vehicle exterior component according to claim 3, wherein the refraction surface is offset rearward from the reflection surface in the electromagnetic wave transmission direction.

5. The vehicle exterior component according to claim 1, wherein:

the housing includes a flange and the projection, the flange being projected toward the cover at a location corresponding to an edge of the cover, and the projection being bent and projected toward the cover at a location closer to a central part of the cover than the flange;

the substrate and the lens are located between the projection and the flange; and a part of the projection of the housing facing the cover includes a the white layer reflects and diffuses incident light reflected by the ornamental portion of the cover.

6. The vehicle exterior component according to claim 1, wherein the cover and the housing form an emblem.

* * * * *